(12) United States Patent
Cragun et al.

(10) Patent No.: US 8,443,304 B2
(45) Date of Patent: May 14, 2013

(54) CONDITIONAL MODIFICATION OF BROWSER CONTENT

(75) Inventors: Brian J. Cragun, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/853,777

(22) Filed: Aug. 10, 2010

(65) Prior Publication Data

US 2012/0042289 A1 Feb. 16, 2012

(51) Int. Cl.
*G06F 3/14* (2006.01)
*G06F 3/17* (2006.01)

(52) U.S. Cl.
USPC ........... 715/865; 715/747; 715/742; 345/747; 717/168; 717/174

(58) Field of Classification Search .......... 715/200–277, 715/700–867; 700/701–866; 709/201–229; 705/50–79; 345/30–111; 707/200–206
See application file for complete search history.

(56) References Cited

U.S. PATENT DOCUMENTS 7,546,534 B1 * 6/2009 Andrews et al. .............. 715/747

OTHER PUBLICATIONS

"Information about Photosensitive Seizure Disorders'", Trace Center, last updated Jun. 24, 2009, available from http://trace.wisc.edu/peat/photosensitive.php, copyright by The Board of Regents of the University of Wisconsin System.
"Photosensitive Epilepsy Analysis Tool", Trace Center, last updated Mar. 15, 2010, available from http://trace.wisc.edu/peat, copyright by The Board of Regents of the University of Wisconsin System.

* cited by examiner

*Primary Examiner* — Ruay Ho
(74) *Attorney, Agent, or Firm* — Patterson & Sheridan, LLP

(57) ABSTRACT

Embodiments of the invention provide a browser configured to conditional display content to ensure a safe viewing environment. Embodiments of the invention include retrieving content in response to a request from a user, identifying one or more portions of the retrieved content that satisfy predefined citeria, modifying the one or more portions and displaying the modified content to the user.

16 Claims, 9 Drawing Sheets

CONDITIONAL MODIFICATION OF BROWSER CONTENT

BACKGROUND

Embodiments of the invention generally relate to browsers, and more specifically to providing a browser for individuals with epilepsy.

Epilepsy is the most well-known type of photosensitive seizure disorder an estimated one in every four-thousand people is diagnosed with photosensitive epilepsy. Certain flashes of light, certain images and other repetitive patterns may trigger seizures for individuals with epilepsy. Additionally, certain web pages displayed in a web browser may trigger these seizures. Currently, responsible web designers may take affirmative steps to ensure their web pages are safe for view by individuals with epilepsy. Current standards for creating safe content include Section 508 of the Workforce Investment Act of 1998, Web Content Accessibility Guidelines (WCAG) 1.0 and 2.0, HFES 200 Software User Interface Standard and ISO 9241-171 Software Accessibility Standard.

Furthermore, a web designer may scan a web page using existing programs, such as the Trace Center's Photosensitive Epilepsy Analysis Tool (PEAT), to determine whether the web page is safe for view by individuals with epilepsy. If the program determines the page is unsafe, the web designer may alter the code or media included on the web page to make the page epileptic safe. However, these tools do not protect end-users against unsafe content created by malicious or irresponsible authors. As a result, individuals with epilepsy may be at risk when using a browser. Furthermore, an individual suffering an epileptic seizure may be unable to navigate away from the harmful content, as a result of the seizure, thus increasing the danger of the unsafe content.

SUMMARY

Embodiments of the invention provide a computer-implemented method, computer program product, and system for avoiding potentially unsafe content. The computer-implemented method, computer program product, and system include receiving a request from a browser to retrieve displayable content. The computer-implemented method, computer program product, and system further include, in response to receiving the request, retrieving the displayable content specified in the request. Additionally, the computer-implemented method, computer program product, and system include identifying an unsafe portion of the displayable content, wherein the unsafe portion satisfies one or more predetermined criteria describing content that may cause a photosensitive seizure in a viewer of the content when displayed. Furthermore, the computer-implemented method, computer program product, and system include modifying the displayable content to remove the unsafe portion of the displayable content. The computer-implemented method, computer program product, and system also include, in response to the request, outputting the modified displayable content for display in the browser.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
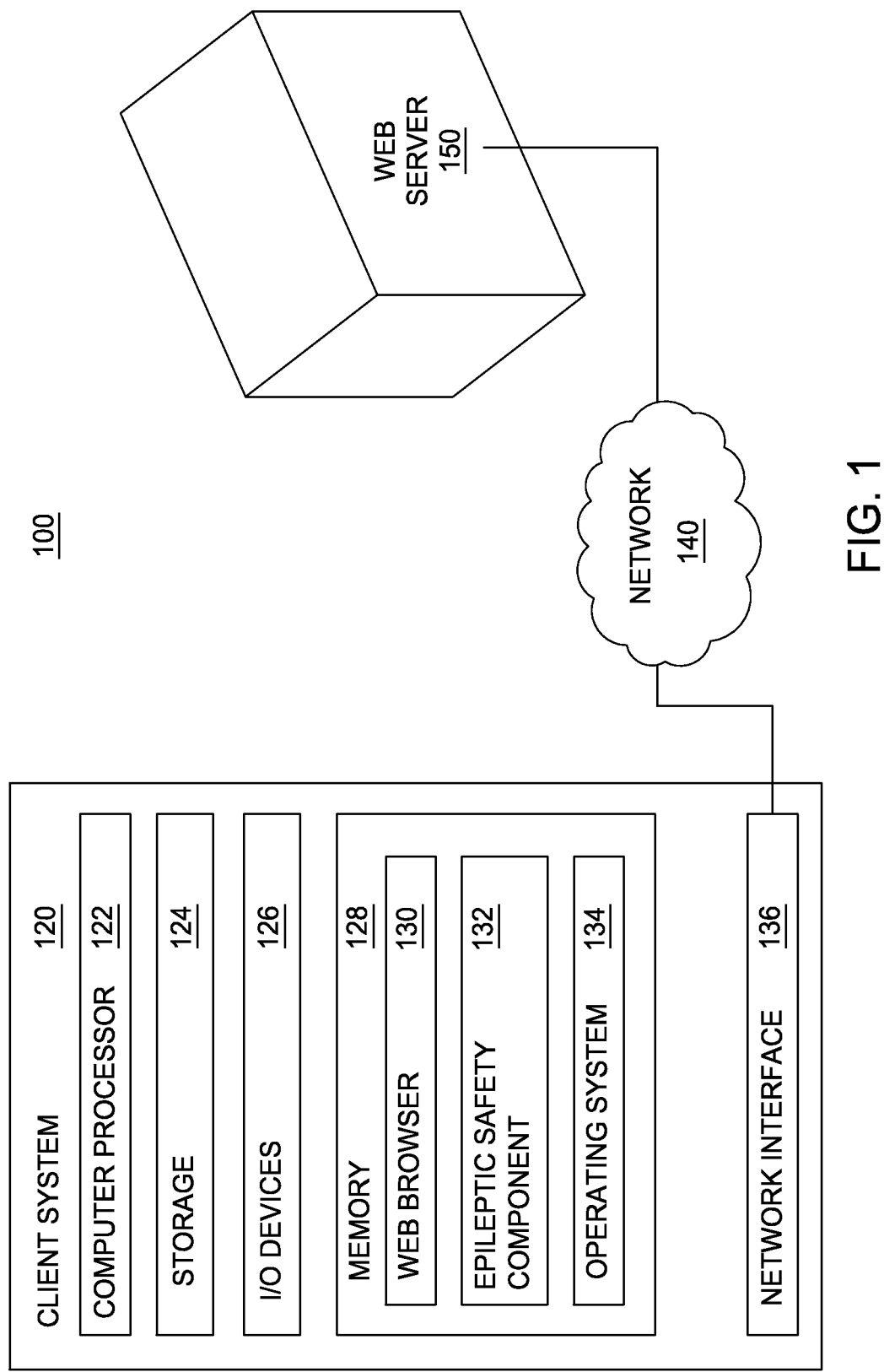
FIG. 1 is a block diagram of a networked computer system configured to run an epileptic safety component, according to one embodiment of the invention.

Epileptic seizures may be triggered by certain flashes of light or repetitive patterns. For example, strobe lights, flashes of bright light through leaves, and certain videos and animations are all known stimuli for epileptic seizures. Certain factors may influence whether a particular animation is unsafe for display to individuals with epilepsy. For example, if an image contains more than three general flashes of light within a one-second period of time, the image may be unsafe for display. Likewise, an image may be unsafe if the image contains more than three red flashes of light within the same period of time. Additionally, the size of the flashing area may be determinative in whether the image is safe for display. For example, a particular animation displayed in a large portion of the screen may be unsafe for view by individuals with epilepsy. However, the same animation may be safe for display when it displayed in a very small portion of the screen Embodiments of the invention may retrieve requested content for a user. Embodiments of the invention may further determine whether the retrieved content is safe for display to a user with epilepsy. Upon determining that a portion of the retrieved content is unsafe for display, embodiments of the invention may modify the unsafe portion of the retrieved content to make the content epileptic safe. Embodiments may then display the retrieved content, including any modifications, to the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of a networked computer system configured to run an epileptic safety component, according to one embodiment of the invention. As shown, the system 100 includes a client system 120, a network 140, and a web server 150. The client system 120 contains a computer processor 122, storage media 124, I/O devices 126, memory 128 and a network interface 136. Computer processor 122 may be any processor capable of performing the functions described herein. I/O devices 124 may represent a variety of input and output devices, including keyboards, mice, visual displays, printers and so on. The primary system 120 may connect to the network 140 using the network interface 136. Furthermore, as will be understood by one of ordinary skill in the art, any computer system 120 capable of performing the functions described herein may be used.

In the pictured embodiment, memory 128 contains a web browser 130, an epileptic safety component (ESC) 132, and an operating system 134. Although memory 128 is shown as a single entity, memory 128 may include one or more memory devices having blocks of memory associated with physical addresses, such as random access memory (RAM), read only memory (ROM), flash memory or other types of volatile and/or non-volatile memory. Furthermore, although the pictured embodiment includes a web browser 130 contained on a computer system 120, other forms of browsers capable of performing the functions described herein may be used 130. Additionally, as used herein, the term "browser" generally refers to any application capable of retrieving and displaying content. For example, in one embodiment, the browser is implemented as an application running on a mobile phone and capable of retrieving and displaying content. As a second example, in the pictured embodiment, the browser is implemented as the web browser 130, which may generally retrieve and display information resources (e.g., web pages) from a server (e.g., web server 150). The operating system 130 may be any operating system capable of performing the functions described herein.

Web server 150 may generally receive requests specifying a Uniform Resource Identifier (URI), and upon receiving such a request, the web server 150 may respond with content associated with the URI. For example, a user may request content at URI "http://www.domainname.tld", using the web browser 130 on the client system 120. The request may be routed through the network 140 to the web server 150. Upon receiving the request, the web server 150 may determine that a particular web page "index.html" is associated with the URI "http://www.domainname.tld". The web server 150 may then return (e.g., using the network 140) the web page "index.html" to the web browser 130. Upon receiving the web page, the web browser 130 may display the web page to the user (e.g., using an I/O device 126, such as a monitor).

However, the retrieved web page may include content that, if displayed, may be harmful to individuals with epilepsy. Such unsafe content may be created a malicious web designer or artist, with the intent of harming individuals with epilepsy. Alternatively, the unsafe content may simply be inadvertently created by a web designer or artist unfamiliar with the specifics of epilepsy. In any event, the ESC 132 may identify any unsafe portions of the web page. In one embodiment, the ESC 132 may identify the unsafe portions before the web page is displayed to the user. The ESC 132 may then modify the web page to remove any identified unsafe portions. For instance, the ESC 132 may modify the web page by replacing the unsafe content with a generic image. Once all unsafe content in the web page is modified, the web browser 130 may display the modified web page to the user.

In one embodiment, the ESC 132 then prompts the user to determine whether the removed content should be displayed. In another embodiment, the ESC 132 may convert an unsafe animation into a series of still images, where each image represents a frame of the animation. The ESC 132 may then display the still images to the user, effectively allowing the user to view the content without the unsafe animation.

Although the ESC 132 is shown as a separate entity in memory 128 of the client system 120, in one embodiment, the ESC 132 is implemented as part of the web browser 130. In another embodiment, the ESC 132 is implemented a plug-in of the web browser 130. In yet another embodiment, the ESC 132 resides on a separate computer system, connected to the client system 120 and web server 150 via the network 140. Thus, for example, the ESC 132 may reside on a computer system maintained by an internet service provider (ISP). In this embodiment, the ESC 132 may intercept traffic passing over the network 140 between the client system 120 and web server 150, and upon detecting content unsafe content, may remove or modify the content. In one embodiment, the ESC 132 is implemented as a service offered only to users who sign up for the service. Furthermore, in one embodiment, a fee may be charged for the service as part of the sign up process. Additionally, in one embodiment, the ESC 132 is implemented as a service on the web server 150. These examples are intended as illustrative examples only, and of course any other implementation of the ESC 132 capable of performing the functions described herein may be used.

Additionally, embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access displayable content or related data that is monitor by the ESC 132 and is available in the cloud. For example, the ESC 132 could execute on a computing system in the cloud and monitor incoming and outgoing traffic from the cloud. In such a case, the ESC 132 could monitor the traffic to identify any epileptic unsafe content coming into or being sent from the cloud. The ESC 132 could then modify the unsafe content to convert it into content safe for view by individuals with epilepsy. Doing so allows a user to access epileptic safe content from any computing system attached to a network connected to the cloud (e.g., the Internet).

Figure 2:
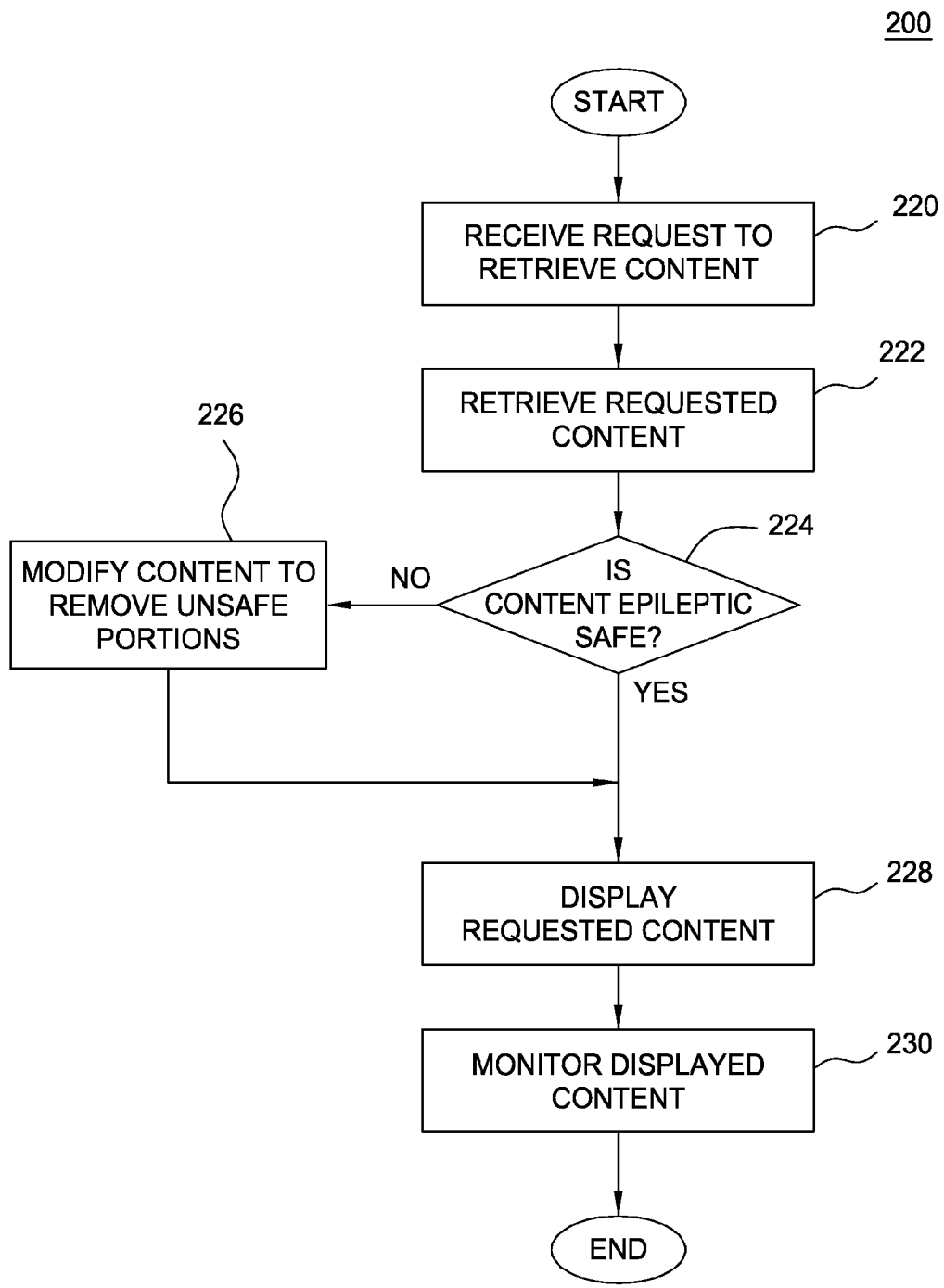
FIG. 2 is a flow diagram illustrating a method of modifying and monitoring content to be epileptic safe, according to one embodiment of the invention.

FIG. 2 is a method of modifying and monitoring content to be epileptic safe, according to one embodiment of the invention. As shown, the method 200 begins at step 220, where the web browser 130 receives a request to retrieve content. As discussed above, the request may designate the content to retrieve using a URI, such as "http://www.domainname.tld". Upon receiving the request, the web browser 130 retrieves the requested content (step 222). The content may be retrieved from another computer system (e.g., the web server 150), or may be retrieved locally on the client system 120.

Once the content is retrieved, the ESC 132 determines whether the content is safe for view by individuals with epilepsy (step 224). If the ESC 132 determines the content is unsafe, the ESC 132 may then further determine which portions of the content are unsafe. For example, in a retrieved web page containing three images, the ESC 132 may determine that one of the images is unsafe for view by individuals with epilepsy. Once the ESC identifies 132 the unsafe portions of the content, the ESC 132 modifies the retrieved content to remove the unsafe portions (step 226). Thus, continuing the above example, the ESC 132 may simply remove the unsafe image from the web page.

Once the unsafe content is removed, or alternatively, if the ESC 132 determines the retrieved content is safe, the web browser displays the requested content (step 228). The ESC 132 then monitors the displayed content to detect any subsequent unsafe behavior (step 230). In one embodiment, the ESC 132 may analyze the entirety of the retrieved content before any of the content is displayed. In such an embodiment, the ESC 132 may avoid monitoring the displayed content, as such monitoring may be redundant. However, in other embodiments, the ESC 132 may analyze only an initial portion of the retrieved content (e.g., the source code) to detect and modify any unsafe areas, and may then display the modified initial portion of the content. The ESC 132 may then continue monitoring the displayed content, so that if a portion of the content subsequently becomes unsafe, the ESC 132 may detect and correct this.

Furthermore, the user may not wish to wait for the entirety of the content to be analyzed before at least a portion of the content is displayed. For example, if a user is streaming a lengthy movie using the web browser 130, the user may wish to begin watching the movie immediately, rather than waiting a substantial amount of time for the entirety of the movie to be analyzed for unsafe content. Furthermore, because the user may only watch one portion of the movie file at a time, the ESC 132 may only monitor the user's current position in the playback. As such, the ESC 132 may only scan a portion of the movie before displaying the content. The ESC 132 may then continue monitoring the playback of the movie in order to detect and disable any unsafe content. In one embodiment, the ESC 132 may monitor a predetermined amount of time ahead of the current playback position. For example, the ESC 132 may be configured to monitor up to 1 minute ahead of the current playback position for a movie. As such, in this example, if the user viewing the movie at the position of 5 minutes into the movie, the ESC 132 may monitor the movie up to the position of 6 minutes into the movie. Additionally, in an embodiment where the user may "fast forward" or otherwise skip ahead in the playback, the ESC 132 may adjust the section of the media being monitored to stay up to 1 minute ahead of the user's new playback position. By monitoring and removing unsafe content in real time, the ESC 132 may prevent unsafe content from being displayed to the user, while minimizing any delay to the user.

The ESC 132 may continue monitoring the displayed content until an event occurs signifying that monitoring is no longer needed. Examples of such events include, but are not limited to, the user navigating to a new web resource, the user closing the web browser 130, and the user explicitly disabling the monitoring. Once the ESC 132 stops monitoring the displayed content, the method 200 ends.

Figure 3:
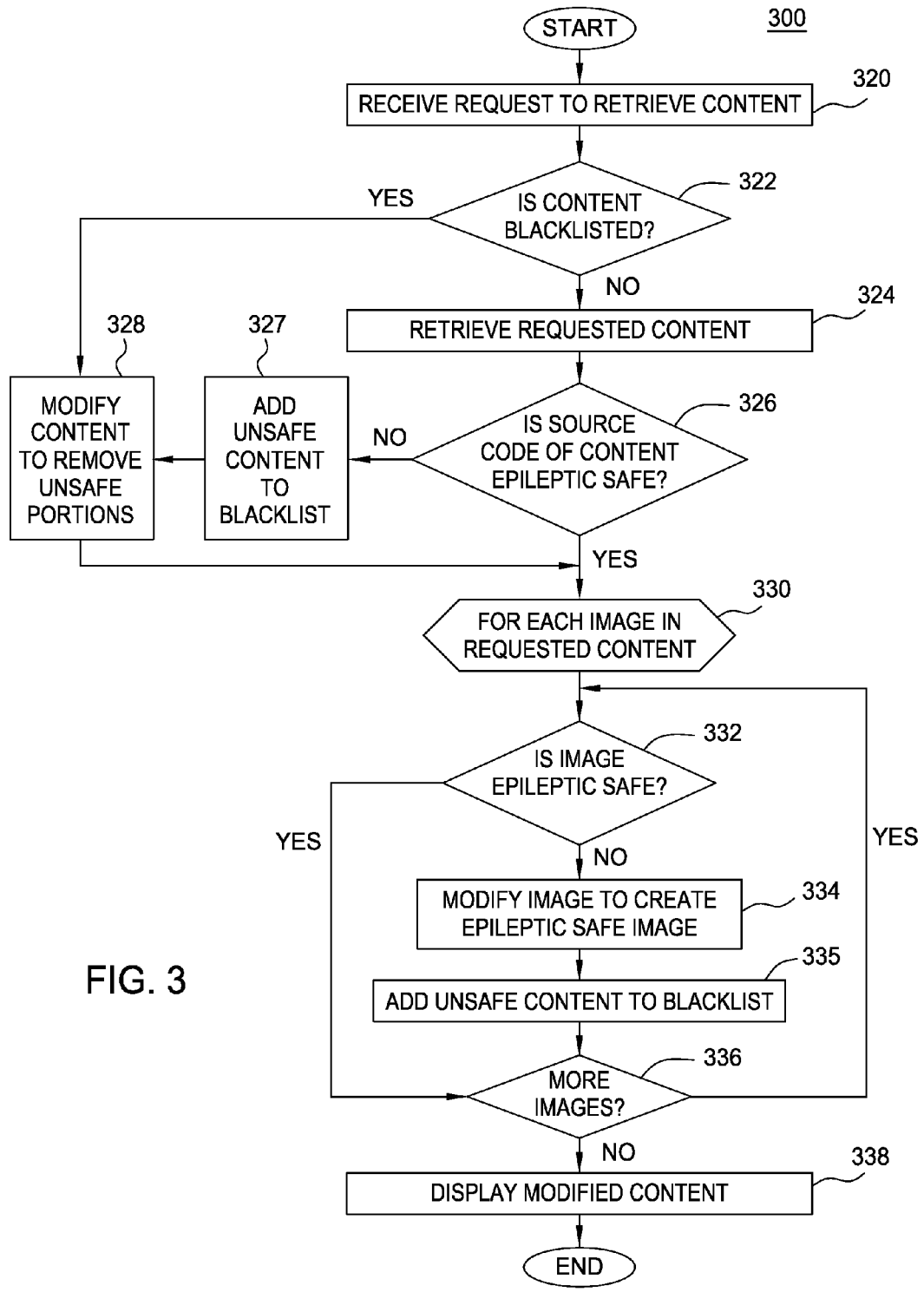
FIG. 3 is a flow diagram illustrating a method of modifying content containing images to be epileptic safe, according to one embodiment of the invention.

FIG. 3 is a method of modifying content containing images to be epileptic safe, according to one embodiment of the invention. As shown, the method 300 begins at step 320, where the web browser 130 receives a request to retrieve content from the web server 150. Upon receiving the request, the ESC 132 determines whether the requested content is blacklisted (step 322). Generally, a blacklist specifying unsafe content may be maintained. In one embodiment, the ESC 132 maintains the blacklist locally on the client system 120. In another embodiment, the blacklist is maintained on a central repository, which the ESC 132 may access using the network 140. The ESC 132 may determine whether a requested resource is blacklisted by searching the blacklist (either a local copy or centralized copy) for the URI of the requested content.

If the ESC 132 determines the content is not blacklisted, the ESC 132 submits the request to the web server 150. The web server 150, in response, returns the content specified in the request to the client system 120 (step 324). The ESC 132 then parses the returned content to determine whether the source code of the content is epileptic safe (step 326). The ESC 132 may parse the source code of the retrieved content to identify any unsafe lines of code. For example, the ESC 132 may determine that one or more lines in a cascading style sheet (CSS) section of the content render the content unsafe to display. Once the unsafe content is determined, the ESC 132 adds the unsafe content to the blacklist (step 327). As noted above, the blacklist may be locally maintained on the client system 120 or may be maintained on another computer system (e.g., a centralized blacklist server).

If the content is determined to be blacklisted, or once the unsafe content is added to the blacklist, the ESC 132 modifies the retrieved content to remove any unsafe portions (step 328). For example, if the retrieved content contains one or more lines in a CSS section of the content that render the content unsafe to display, the ESC 132 may simply remove these lines from the document. In one embodiment, the ESC 132 may also substitute similar lines that are known to be safe into the document. In another embodiment, the ESC 132 may modify individual values on the unsafe lines, such that the modified lines as a whole are epileptic safe. In one embodiment, the blacklist may specify one or more unsafe areas of the content and how these areas may be modified in order to make them epileptic safe.

In any event, once the source code of the content has been determined to be epileptic safe, or once the unsafe source code has been modified to be epileptic safe, the method 300 enters a loop for each image specified in the requested content (step 330). For each image, the ESC 132 determines whether the image is epileptic safe (step 332). If the image is determined to be unsafe, the ESC 132 may modify the image in order to create an epileptic safe image (step 334). In one embodiment, this is accomplished by substituting a placeholder image that is known to be safe for the unsafe image.

In another embodiment, this is accomplished by substituting a prompt in the place of the image, through which the user may specify whether he wishes the potentially unsafe image to be loaded. In this embodiment, the ESC 132 may include a failsafe mechanism, such that if the user indicates he wishes the potentially unsafe image to be loaded, the ESC 132 will display the image and initiate a failsafe timer. The ESC 132 will further prompt the user as to whether the image should continue being displayed. If the user fails to acknowledge the prompt within the time specified by the failsafe timer, the ESC 132 may automatically stop displaying the image. Such a timer is advantageous, in the sense that if the unsafe image has in fact caused harm to the user (e.g., an epileptic seizure), the user may be unable to navigate away from the image or web page, or to even look away from the unsafe image, without assistance.

Once the image is modified to be epileptic safe, the ESC 132 adds the unsafe image to the blacklist (step 335). In one embodiment, the ESC 132 may add the entirety of the retrieved content (including any associated URI) to the blacklist. If the image is determined to be safe, or once the unsafe content is added to the blacklist, the ESC 132 determines whether there are more images to be processed in the retrieved content (step 336). If there are more images to process, the loop begins again at step 332, whether the ESC 132 determines whether the next image is safe. If instead the ESC 132 determines there are no more images to process, the web browser 130 displays the modified content to the user (338). In one embodiment, the ESC 132 may continue monitoring the displayed content, in the event that the content subsequently becomes unsafe. Once the content has been displayed, the method 300 ends.

Figure 4:
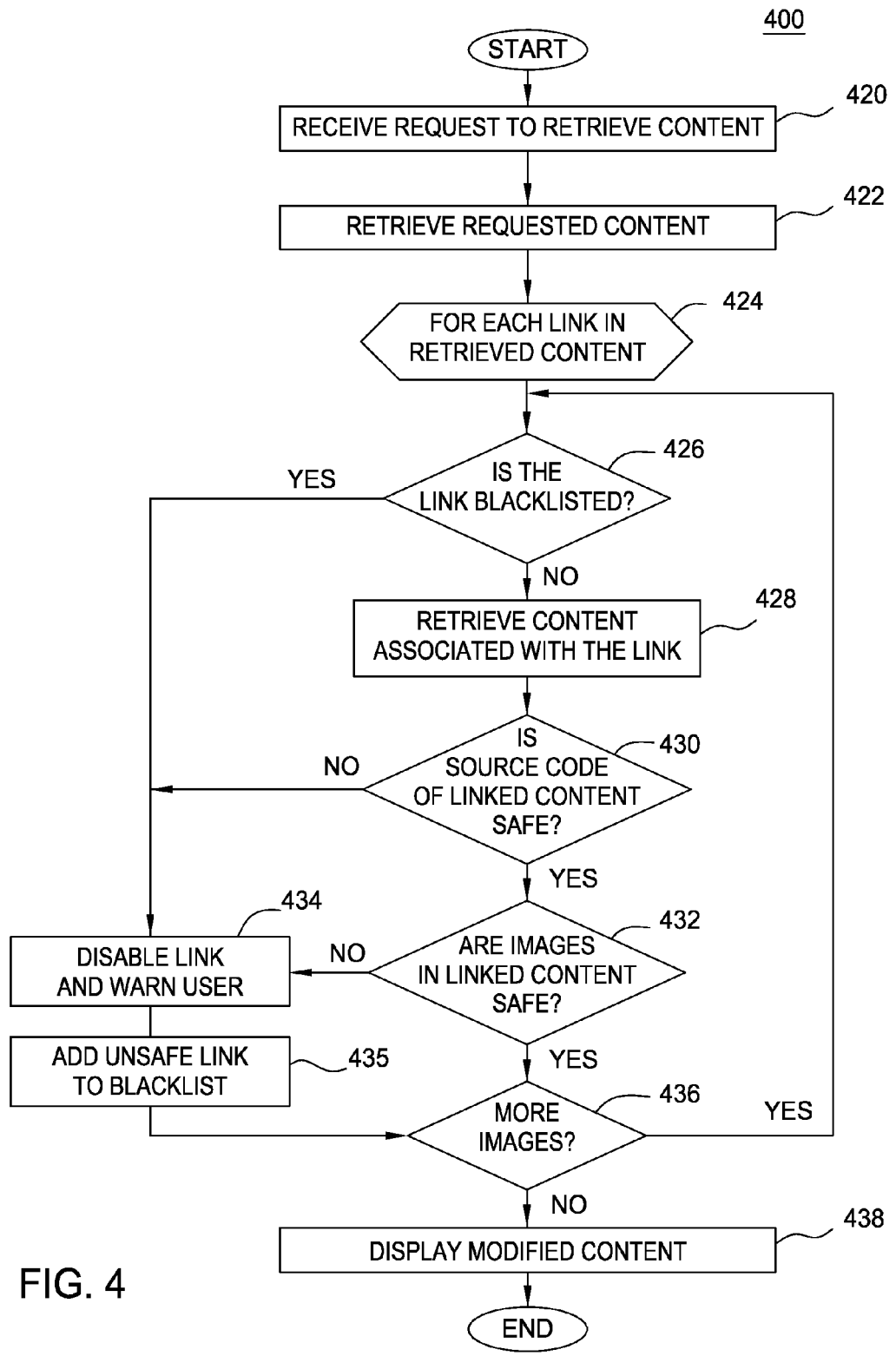
FIG. 4 is a flow diagram illustrating a method of modifying content containing links to be epileptic safe, according to one embodiment of the invention.

FIG. 4 is a method of modifying content containing links to be epileptic safe, according to one embodiment of the invention. As shown, the method 400 begins at step 420, where the web browser 130 receives a request to retrieve content from the web server 150 (step 420). As an example of the request, a user may click a hyperlink on a previous web page, indicating that the web browser 130 should retrieve the content specified by the hyperlink. The request is then forwarded to the web server 150, which, in response to the request, returns the associated content (step 422).

The method 400 then begins a loop at step 424, where, for each link in the initially retrieved content, the ESC 132 determines whether the link is blacklisted (step 426). Generally, such a blacklist may include links that have been previously determined to refer to unsafe content. In one embodiment, the ESC 132 determines whether a particular link is blacklisted by determining whether the URI for the link appears on the blacklist. If the ESC 132 determines the link is not blacklisted, the ESC 132 retrieves the requested content (step 428). For example, the ESC 132 may submit a request to the web server 150 to retrieve content associated with the link. The web server 150, in response, returns the associated content.

Upon receiving the content specified by the link, the ESC 132 determines whether the source code of the linked content is safe for display (step 430). For example, unsafe source code may include CSS code designed to create a series of flashing colors by rapidly changing the background of the web page. If the source code of the linked content is determined to be safe, the ESC 132 further determines if any of the images in the linked content are unsafe (step 432). As discussed above, an example of an unsafe image may be an animated image containing a series of flashing colors. In one embodiment, in addition to processing the images in the linked content, the ESC 132 may further process all videos and other animations in the linked content to determine if they are epileptic safe.

If the ESC 132 determines the link is blacklisted, or if the ESC 132 determines the source code of the linked content is unsafe, or if the ESC 132 determines at least one image in the linked content is unsafe, the ESC 132 disables the link in the initially retrieved content (step 434). The ESC 132 may also provide a notification to the user as to why the link is disabled. For example, the ESC 132 may change the color of the text of a link (e.g., using a faded grey color to indicate the link is disabled) to indicate the link is disabled. Other exemplary notifications include inserting text next to the link, inserting an image next to the link, and creating a pop-up window in the web browser 130. Of course, other notifications may be used to notify the user the link has been disabled for including unsafe content.

In one embodiment, the ESC 132 may allow the user to override the disabling of the link. The ESC 132 may then caution the user that the link may contain unsafe content. In another embodiment, the ESC 132 may disable the link only until the ESC 132 has modified the linked content to be epileptic safe. Such modifications may include techniques disclosed herein to make a page epileptic safe. Once the unsafe link is disabled, the ESC 132 adds the unsafe link to the blacklist (step 435). As discussed above, the blacklist may be locally maintained on the client system 120, or may be maintained on another computer system or device (e.g., a centralized blacklist repository). In one embodiment, if the link was originally determined to be blacklist (at step 426), the ESC 132 may abstain from performing step 435 and re-adding the unsafe content to the blacklist.

If the ESC 132 determines that all of the images are safe for display, or once the ESC 132 adds the unsafe content to the blacklist, the ESC 132 then determines whether there are more links in the initially retrieved content to process (step 436). If the ESC 132 determines there are more links to process, the loop begins again at step 426, where the ESC 132 determines whether the next link in the initially retrieved content is blacklisted. If there are no more links to process, the web browser 130 displays the retrieved content, including any modifications made to the links in the content (step 438). As such, the displayed content is not only safe for display, but also notifies the user of any unsafe links on the web page. Once the content is displayed, the method 400 ends.

One advantage to the method 400 is that it may improve the performance of the user's browsing experience, as it effectively prefetches all the links from the current page. Thus, if a user then clicks on one of the links, the content associated with the URI specified in the link has already been retrieved, and may be immediately displayed to the user. Furthermore, the method 400 also scans these pages for unsafe content in the process of prefetching the content. As a result, since content for a link may have already been prefetched and verified to be safe for display (or in the case the content was unsafe, the content has been modified to be epileptic safe), the user may experience little to no delay in viewing a linked page after clicking on the link. Furthermore, the user may be assured that the displayed content associated with the link will be epileptic safe once it is displayed.

Figure 5A:
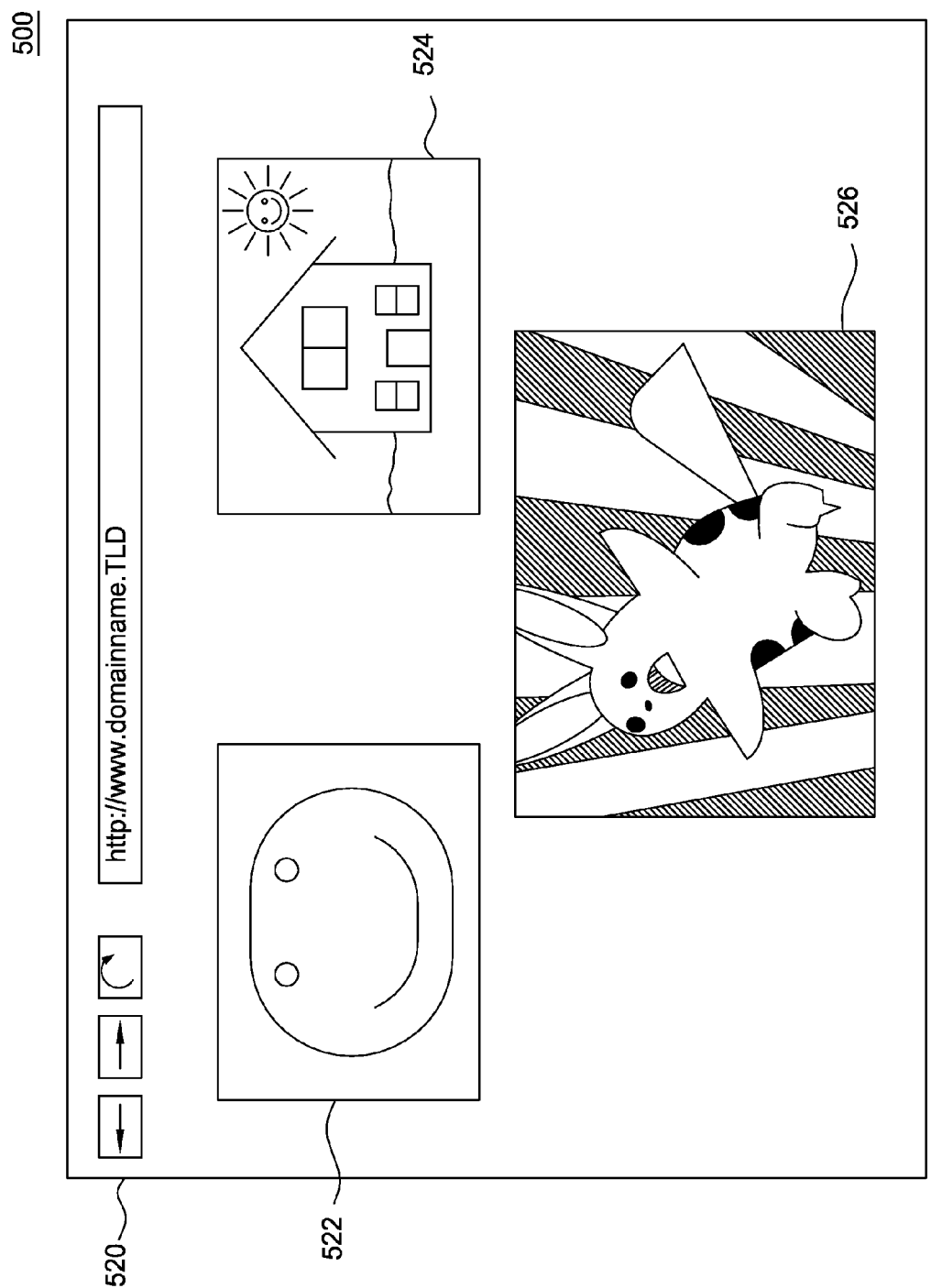
FIGS. 5A-5E are exemplary embodiments of epileptic-safe browsers, according to one embodiment of the invention.

FIGS. 5A-5E are exemplary embodiments of epileptic-safe browsers, according to one embodiment of the invention. As shown, FIG. 5A shows a screenshot 500 of an exemplary web page 520, displayed in an exemplary web browser 130. The web page 520 contains three images: a first image 522, a second image 524 and a third image 526. In the pictured example, the ESC 132 may have determined that all three images 522, 524 and 526 are epileptic safe. Thus, all three images 522, 524 and 526 are displayed in their entirety to the user.

Figure 5B:
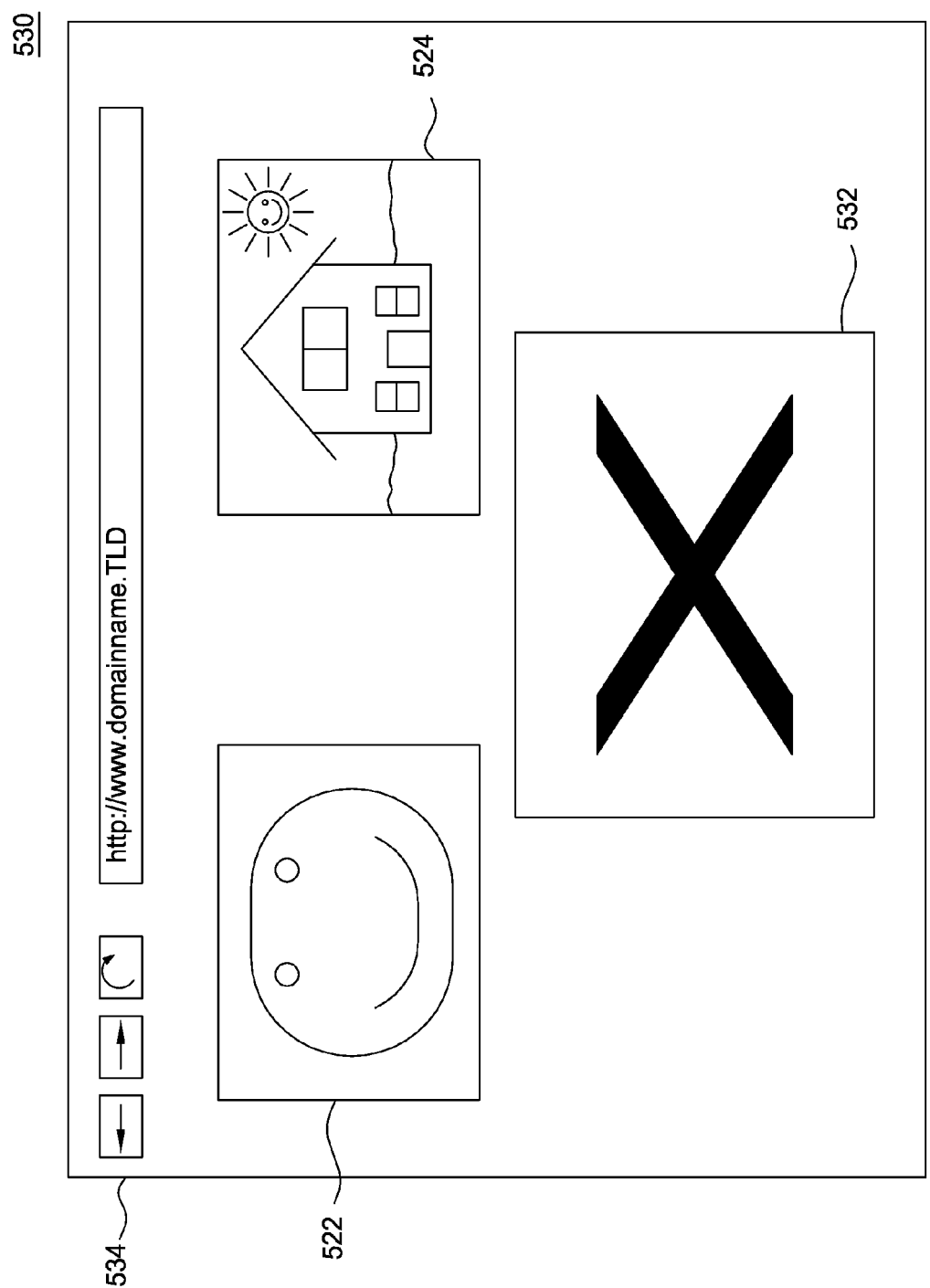

In contrast, FIG. 5B shows a screenshot 530 of an exemplary web page 534, also containing three images: the first image 522, the second image 524, and a third image 532. In this example, although the ESC 132 may have determined the first image 522 and second image 524 are epileptic safe images, the ESC 132 may have further determined that the third image 532 was unsafe. As such, in this embodiment, the ESC 132 has replaced the third image 532 with a fixed image of an "X", indicating that the original image was removed from the web page 534. Of course, other symbols and other indicators may be used to notify the user that the original image 532 was removed. Thus, the ESC 132 has modified the originally unsafe content to be safe for display. Furthermore, the ESC 132 has modified the unsafe content in a way that indicates to the user that the unsafe image 532 has been removed.

Figure 5C:
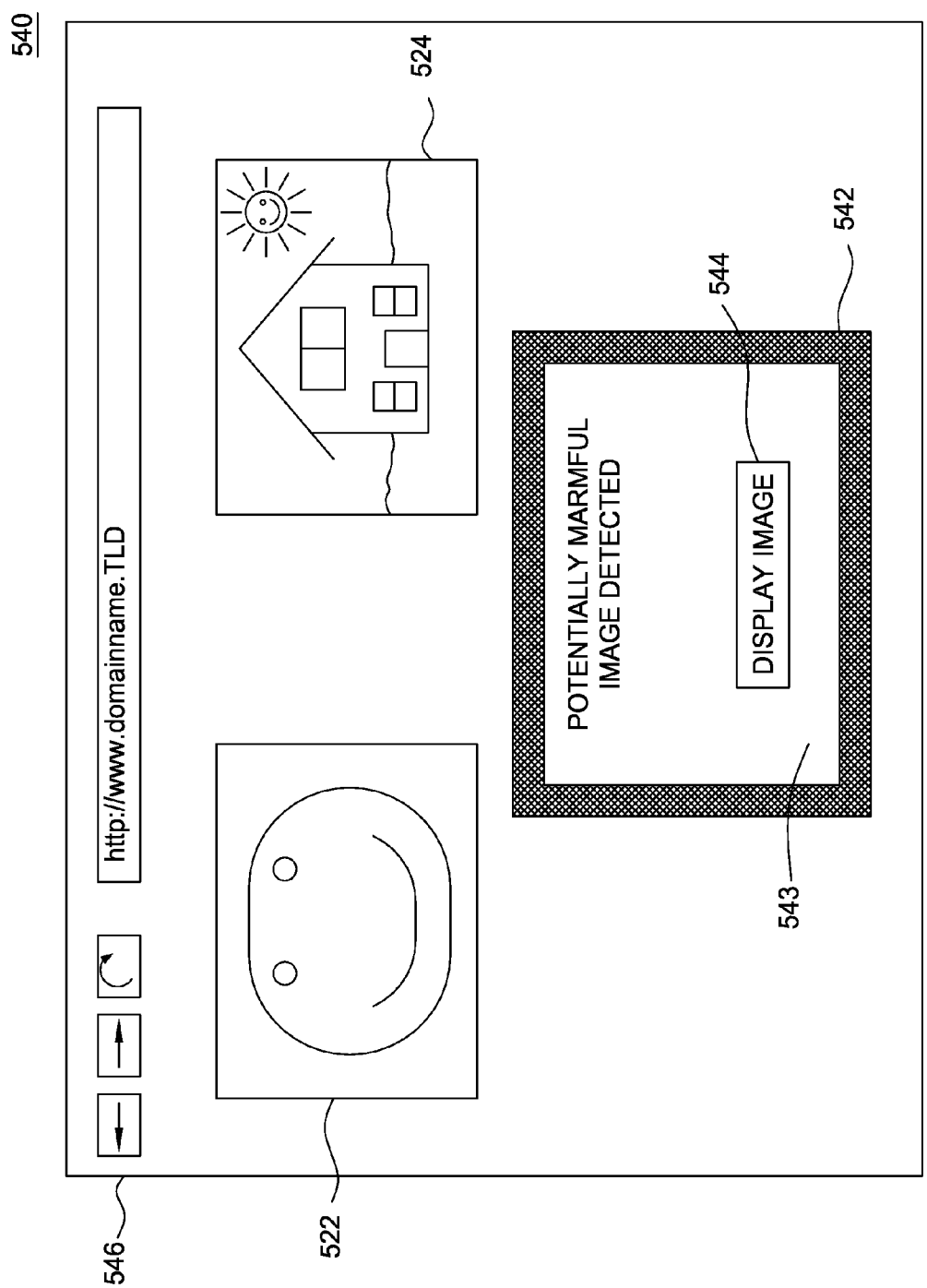

FIG. 5C shows a screenshot 540 of an exemplary web page 546. Similar to the web page 534 of FIG. 5B, the web page 546 contains three images: the first image 522, the second image 524 and a third image 542. As shown, the ESC 132 has determined that the third image 542 is unsafe for display. In this embodiment, the ESC 132 has blacked out the unsafe image 542, and in its place has included a dialog 543 indicating that a potentially unsafe image was detected. In one embodiment, the dialog 543 is contained in a pop-up window. In this example, the dialog 543 contains a button 544 for displaying the unsafe image. Thus, in this embodiment, the user may use the button 544 to override the ESC's 132 decision to disable the unsafe image 542. Upon detecting that the button 544 is pressed, the web browser 132 may display the unsafe image 542.

In one embodiment, id the user requests to override the disabling of the image, the ESC 132 may initiate a failsafe timer. The ESC 132 may then prompt the user as to whether the image should continue to be displayed. If the user does not respond to the prompt within the amount of time specified by the failsafe timer, the ESC 132 may remove the image from display. As noted above, in the event that unsafe content triggers an epileptic seizure in the user, the user may be unable to navigate away from the web page 130, or may even be unable to look away from the monitor 126. By using the failsafe timer, embodiments of the invention may mitigate any harm caused to the user by the unsafe image.

Figure 5D:
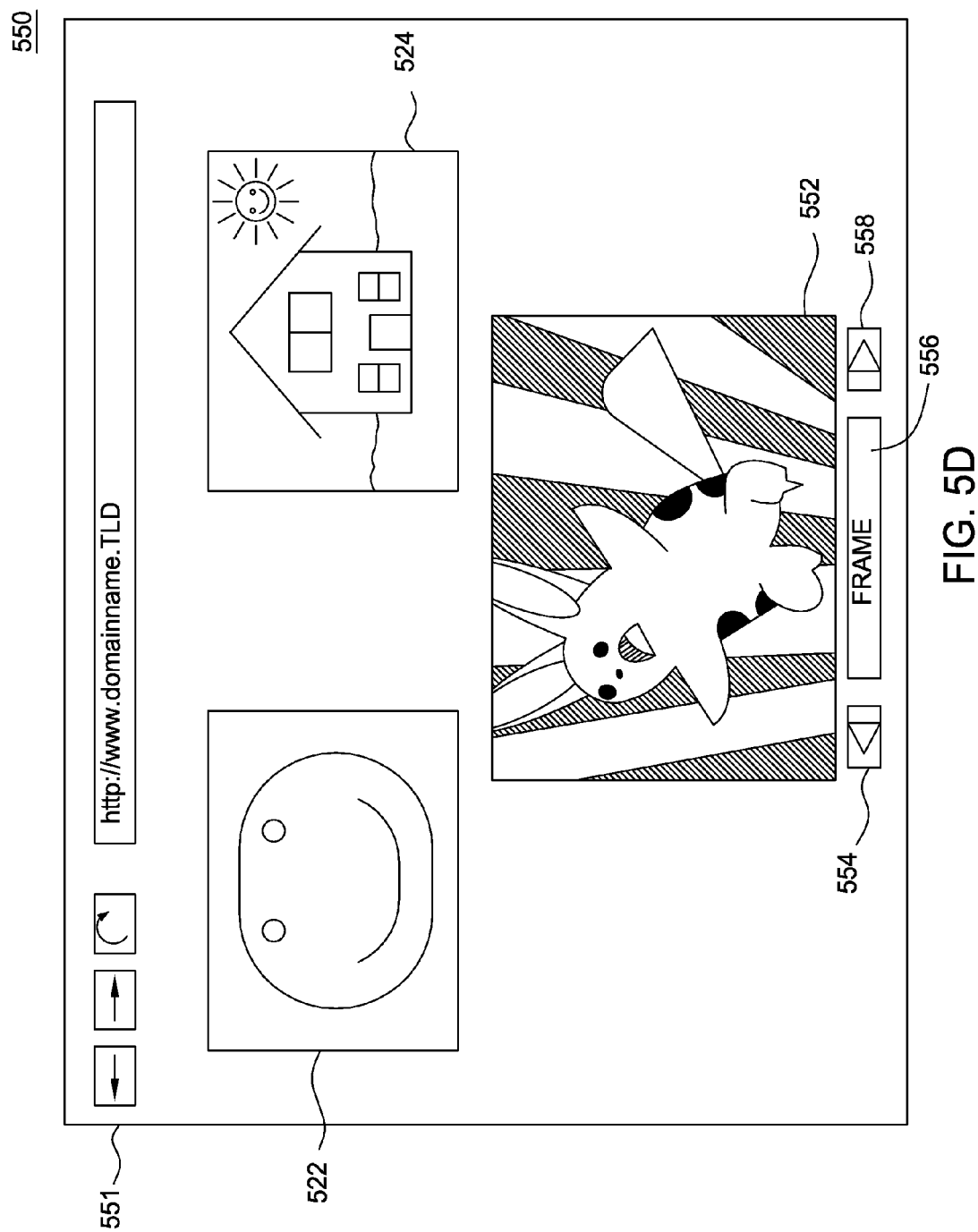

As shown, FIG. 5D shows another screenshot 550 of an exemplary web page 551. The web page 551 contains a first image 522, a second image 524, and a third animated image 552. In this example, the ESC 132 has detected that the animated image 552 is unsafe for display. However, the ESC 132 has further detected that certain frames of the image 552 may be safe to display without the animation. As such, the ESC 132 has split the animated image 552 into one or more frames. As shown, a frame indicator 556 specifies that "Frame 1" of the image is currently being displayed. The ESC 132 may also insert scroll boxes 554 and 558 into the web page 551. The scroll boxes 554 and 558 may allow the user to advance forward in the frames of the image (e.g., by clicking on box 558), and may allow the user to advance backwards in the frames of the image (e.g., by clicking on box 554). Thus, the user may safely view the content of the unsafe animated image 552 as a slideshow of one or more frames. By doing this, the user may still see the content of the unsafe image 552, but may do so safely.

Figure 5E:
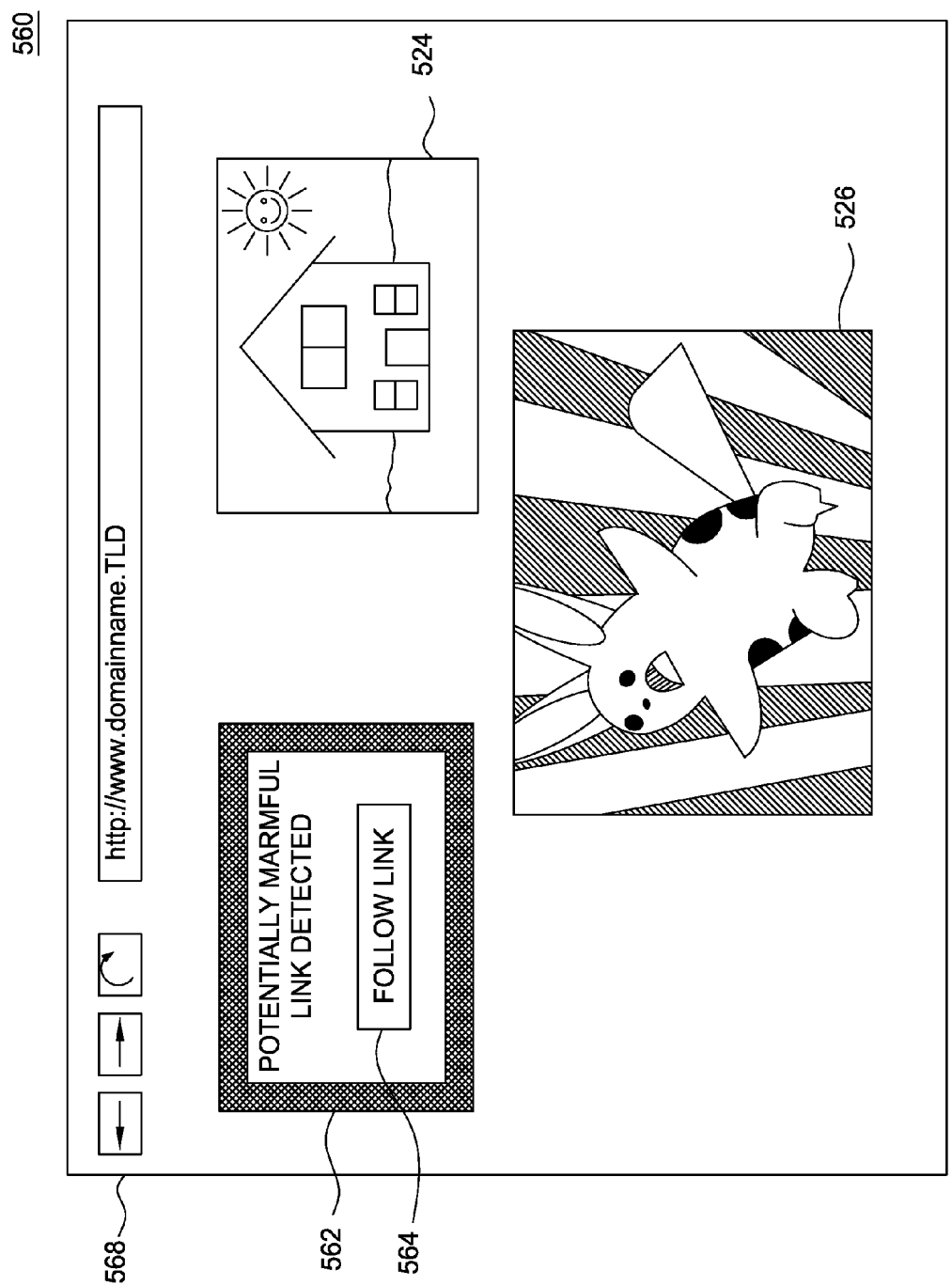

FIG. 5E shows yet another screenshot 560 of an exemplary web page 568. As shown, the web page 568 contains two epileptic safe images: a first safe image 524 and a second safe image 526. In addition, the web page 568 contains a third image 562 associated with an unsafe hyperlink. In this example, the ESC 132 has determined that the link associated with image 562 contains unsafe content. As a result, the ESC 132 has disabled the link associated with image 562, and replaced the image with a notification indicating that the ESC 132 has detected a potentially unsafe link. In the pictured embodiment, the ESC 132 has additionally inserted a clickable button 564 into the web page 568 that, if clicked, will allow the user to navigate to the linked content that has been identified as unsafe. If clicked, the button may also trigger a failsafe mechanism that, as discussed above, may require the user to indicate within a predetermined period of time that the user wishes to continue viewing the content. As discussed above, if the user fails to respond to the failsafe mechanism (e.g., by clicking a button acknowledging that the user wishes to continue viewing the content) within the predetermined period of time, the ESC 132 may stop displaying the unsafe content.

In another embodiment, the failsafe mechanism sends a message to the user to verify that the image was not an unsafe image. For example, the ESC 132 may send an instant message to the user on the client system 120. Exemplary messages include messages over existing chat programs (AIM®, Google Talk®, Skype®, etc.), a message a pop-up window in the web browser 130, or any other similar messages. In another embodiment, the ESC 132 may send other messages, such as Short Message Service (SMS) messages to a phone number associated with the user. Similarly, in yet another embodiment, the ESC 132 may place a phone call to the user to verify that displaying the potentially unsafe image did not harm the user. In one embodiment, such failsafe services may be associated with a fee. Furthermore, in embodiments where the ESC 132 is associated with an initial fee, the various failsafe mechanisms may be associated with additional fees. For example, a base fee structure may include a failsafe timer, whereas a phone call failsafe service may be provided for an additional fee.

In one embodiment of the invention, as part of the failsafe mechanism, the ESC 132 sends a message to another individual associated with the user. For example, a first user may specify in a user profile that a second user should be contacted in the event of an emergency. The first user may further specify emergency contact information (e.g., phone number, instant messenger contact information, address, etc.) for the second user. As such, if the first user fails to respond to the failsafe mechanism, the ESC 132 may contact the second user using the specified contact information and warn the second user that the first user may be experiencing an epileptic seizure. This embodiment is particularly advantageous because, although the ESC 132 may remove the unsafe content from display in response to not receiving the response to the failsafe mechanism, this does not necessarily mean that the user was not harmed by the unsafe content. As such, the user may have already sustained injury from overriding the ESC's 132 disabling of the unsafe content, and may be unable to seek medical attention on his own. By notifying an emergency contact (e.g., the second user), the ESC 132 may mitigate any further injury to the user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of avoiding potentially unsafe content, comprising:
    receiving a request from a web browser to retrieve displayable content;
    in response to receiving the request, retrieving the displayable content specified in the request;
    identifying an unsafe portion of the displayable content, wherein the unsafe portion satisfies one or more predetermined criteria describing content that may cause a photosensitive seizure in a viewer of the content when displayed;
    modifying, by execution of one or more computer processors, the displayable content to remove the unsafe portion of the displayable content, wherein modifying the displayable content to remove the unsafe portion comprises replacing the unsafe portion of the displayable content with a predetermined image, wherein the predetermined image indicates that the unsafe portion was removed from the displayable content; and
    in response to the request, outputting the modified displayable content for display in the web browser.

2. The method of claim 1, further comprising:
    in response to receiving an override request to display the unsafe portion of the displayable content, outputting the unsafe portion of the displayable content for display.

3. The method of claim 2, wherein outputting the unsafe portion further comprises:
    outputting a preview of the unsafe content for display in the web browser; and
    upon receiving a confirmation signal within a predetermined period of time, outputting the unsafe content for display in the web browser.

4. The method of claim 1, wherein the displayable content contains one or more links, and wherein identifying the unsafe portion of the displayable content further comprises:

for at least one link in the one or more links of the displayable content:
    determining whether the link is contained on a list of unsafe links;
    retrieving additional displayable content associated with the link;
    identifying an unsafe portion of the additional displayable content, wherein the unsafe portion satisfies the one or more predetermined criteria describing content that may cause a photosensitive seizure in a viewer of the content when displayed; and
    marking the link as unsafe.

5. A system, comprising:
a computer processor; and
a memory containing a program that, when executed on the computer processor, performs an operation for avoiding potentially unsafe content, comprising:
    receiving a request from a web browser to retrieve displayable content;
    in response to receiving the request, retrieving the displayable content specified in the request;
    identifying an unsafe portion of the displayable content, wherein the unsafe portion satisfies one or more predetermined criteria describing content that may cause a photosensitive seizure in a viewer of the content seizure when displayed;
    modifying the displayable content to remove the unsafe portion of the displayable content;
    in response to the request, outputting the modified displayable content for display in the web browser; and
    in response to receiving an override request to display the unsafe portion of the displayable content, outputting the unsafe portion of the displayable content for display.

6. The system of claim 5, wherein modifying the displayable content to remove the unsafe portion further comprises:
    replacing the unsafe portion of the displayable content with a predetermined image, wherein the predetermined image indicates that the unsafe portion was removed from the displayable content.

7. The system of claim 5, wherein outputting the unsafe portion further comprises:
    outputting a preview of the unsafe content for display in the web browser; and
    upon receiving a confirmation signal within a predetermined period of time, outputting the unsafe content for display in the web browser.

8. The system of claim 5, wherein modifying the displayable content to remove the unsafe portion further comprises:
    generating a plurality of displayable frames, based on the unsafe portion of the displayable content; and
    outputting a first frame of the plurality of displayable frames for display in the web browser.

9. The system of claim 8, the operation further comprising:
in response to receiving a request to display another frame, outputting a second frame of the plurality of displayable frames for display in the web browser.

10. The system of claim 5, wherein the displayable content contains one or more links, and wherein identifying the unsafe portion of the displayable content further comprises:
for at least one link in the one or more links of the displayable content:
    determining whether the link is contained on a list of unsafe links;
    retrieving additional displayable content associated with the link;
    identifying an unsafe portion of the additional displayable content, wherein the unsafe portion satisfies the one or more predetermined criteria describing content that may cause a photosensitive seizure in a viewer of the content seizure when displayed; and
    marking the link as unsafe.

11. A computer program product for avoiding potentially unsafe content, comprising:
a computer-readable memory having computer readable program code embodied therewith, the computer readable program code comprising:
    computer readable program code to receive a request from a browser to retrieve displayable content;
    computer readable program code to, in response to receiving the request, retrieve the displayable content specified in the request;
    computer readable program code to identify an unsafe portion of the displayable content, wherein the unsafe portion satisfies one or more predetermined criteria describing content that may cause a photosensitive seizure in a viewer of the content seizure when displayed;
    computer readable program code to modify the displayable content to remove the unsafe portion of the displayable content, wherein the computer readable program code to modify the displayable content to remove the unsafe portion comprises:
    computer readable program code to generate a plurality of displayable frames, based on the unsafe portion of the displayable content; and
    computer readable program code to output a first frame of the plurality of displayable frames for display in the browser; and
    computer readable program code to, in response to the request, output the modified displayable content for display in the browser.

12. The computer program product of claim 11, further comprising:
computer readable program code to, in response to receiving an override request to display the unsafe portion of the displayable content, output the unsafe portion of the displayable content for display.

13. The computer readable program product of claim 12, wherein the computer readable program code to output the unsafe portion further comprises:
computer readable program code to output a preview of the unsafe content for display in the browser; and
computer readable program code to, upon receiving a confirmation signal within a predetermined period of time, output the unsafe content for display in the browser.

14. The computer readable program product of claim 11, further comprising:
computer readable program code to, in response to receiving a request to display another frame, output a second frame of the plurality of displayable frames for display in the browser.

15. The computer readable program product of claim 11, wherein the displayable content contains one or more links, and wherein the computer readable program code to identify the unsafe portion of the displayable content further comprises:
computer readable program code to, for at least one link in the one or more links of the displayable content:
    determine whether the link is contained on a list of unsafe links;
    retrieve additional displayable content associated with the link;

identify an unsafe portion of the additional displayable content, wherein the unsafe portion satisfies the one or more predetermined criteria describing content that may cause a photosensitive seizure in a viewer of the content when displayed; and mark the link as unsafe.

16. The computer readable program product of claim 11, wherein the computer readable program code to identify the unsafe portion of the displayable content further comprises:

computer readable program code to determine whether an identifier associated with the displayable content is contained on a list of unsafe identifiers.

* * * * *